(12) United States Patent
Keithley

(10) Patent No.: US 8,630,031 B1
(45) Date of Patent: Jan. 14, 2014

(54) COLOR ADJUSTMENT FOR A SCANNED IMAGE

(75) Inventor: Douglas G. Keithley, Boise, ID (US)

(73) Assignee: Marvell International Ltd. (BM)

(*) Notice: Subject to any disclaimer, the term of this patent is extended or adjusted under 35 U.S.C. 154(b) by 996 days.

(21) Appl. No.: 11/811,990

(22) Filed: Jun. 13, 2007

Related U.S. Application Data

(60) Provisional application No. 60/816,720, filed on Jun. 27, 2006.

(51) Int. Cl.
*G03F 3/08* (2006.01)

(52) U.S. Cl.
USPC ............ 358/518; 358/1.9; 358/474; 358/504; 358/505; 358/523; 358/525; 382/162; 382/167

(58) Field of Classification Search
None
See application file for complete search history.

(56) References Cited

U.S. PATENT DOCUMENTS

| | | | |
|---|---|---|---|
| 7,142,238 B1* | 11/2006 | Sawada et al. | 348/252 |
| 7,535,606 B1* | 5/2009 | Walton et al. | 358/509 |
| 2002/0060688 A1* | 5/2002 | Mizumoto | 345/591 |
| 2003/0038956 A1* | 2/2003 | Aotsuka | 358/1.9 |
| 2003/0052894 A1* | 3/2003 | Akiyama et al. | 345/589 |
| 2004/0212814 A1* | 10/2004 | Ishigami | 358/1.9 |
| 2005/0169522 A1* | 8/2005 | Schoner | 382/167 |
| 2005/0190205 A1* | 9/2005 | Koyama | 345/690 |
| 2005/0201617 A1* | 9/2005 | Park et al. | 382/167 |
| 2006/0013478 A1* | 1/2006 | Ito et al. | 382/167 |
| 2007/0247532 A1* | 10/2007 | Sasaki | 348/231.99 |
| 2008/0013850 A1* | 1/2008 | Sakurai et al. | 382/255 |

* cited by examiner

*Primary Examiner* — Miya J Cato

(57) ABSTRACT

The color of a pixel in a scanned image is represented by two color components and is adjustable by interpolating between color component values obtained from elements in a bidimensional color remap look-up table. The table is sparsely populated and may be readily implemented in most scanner circuits without adding memory.

38 Claims, 2 Drawing Sheets

COLOR ADJUSTMENT FOR A SCANNED IMAGE

CROSS-REFERENCE TO RELATED APPLICATION

This application claims the benefit of U.S. Provisional Application No. 60/816,720, filed Jun. 27, 2006 which is hereby incorporated herein by reference.

FIELD OF THE INVENTION

The present disclosure is related to the field of image scanners. Specifically, the disclosure is directed to adjusting the color of a pixel in a scanned image.

BACKGROUND

An image scanner is a device having a light source and a color image sensor head for generating a digital representation of an image. The light source illuminates the image and the color image sensor head moves across the image field (or the image moves relative to the color image sensor head). The color image sensor head receives light reflected off the image and responsively generates digital image data. The digital image data includes values that correspond to intensity and/or other attributes of color components for each picture element (pixel) in the image.

The accuracy of an image scanner can be a measure of color differential between the original image and the colors represented by the digital image data generated by the color image sensor head. While some color image sensor head models perform well and provide accurate digital image data, some models do not. One example of color inaccuracy is digital image data having color component values that define a yellowish-orange color in areas where the original image is pure yellow.

Color correction techniques exist for adjusting the color component values in the digital image data. Some color correction techniques are implemented at the host computer that receives the digital image data from the scanner. Although color inaccuracies can be corrected at a host computer, the process of correcting the color at the host requires the implementation and use of a graphics editor or other application running on the host, which for many uses and/or users is undesirable or even unacceptable.

Other color correction techniques may be implemented in the scanner before outputting the digital image data. Scanner implemented color correction techniques include simple 3×3 multiplication matrices and full 3-D color space conversion algorithms and tables. 3×3 multiplication matrices are simplistic but in most cases provide nominal color correction. Full 3-D color space conversion techniques are comprehensive but the algorithms consume a lot of processing time and slow down the imaging process, which is usually sensed by the user. Also, implementing a 3-D color space conversion table in a scanner typically requires adding or upgrading a memory device and results in an increased cost of the scanner.

SUMMARY

A method, apparatus, and processor executable instructions are disclosed for adjusting in a scanner the color of a pixel in a scanned image. The color is defined in a two-color component color space by a first color component first value and a second color component first value. The YCrCb color space is one example of a two color component color space, wherein Cr and Cb are the color components and Y is a non-color (luminance) component. A bidimensional look-up table is populated with elements having adjusted color component values. The elements are identified by row and column addresses that correspond to initial color component values. The table is used to remap the initial color component values to the adjusted color component values.

According to a first aspect of the disclosure, the table is sparsely populated relative to the total number of possible initial color component value combinations. Adjusted color component values can be obtained for initial color component values that are between the row and column addresses by interpolating within the table elements.

According to a second aspect of the disclosure, a color image sensor head scans the image and provides a set of three color component values in a three-color component color space for defining the color of a pixel. A circuit is configured to convert the set of three color component values to two values in a two-color component color space. In one version the three-color component color space is a RGB color space and the two-color component color space is a YCbCr color space.

According to another aspect of the disclosure, the scanner is part of a multi-function printer in communication with a host computer.

The preferred embodiments will now be described with reference to the attached drawings.

DETAILED DESCRIPTION OF THE PRESENTLY PREFERRED EMBODIMENTS

Figure 1:
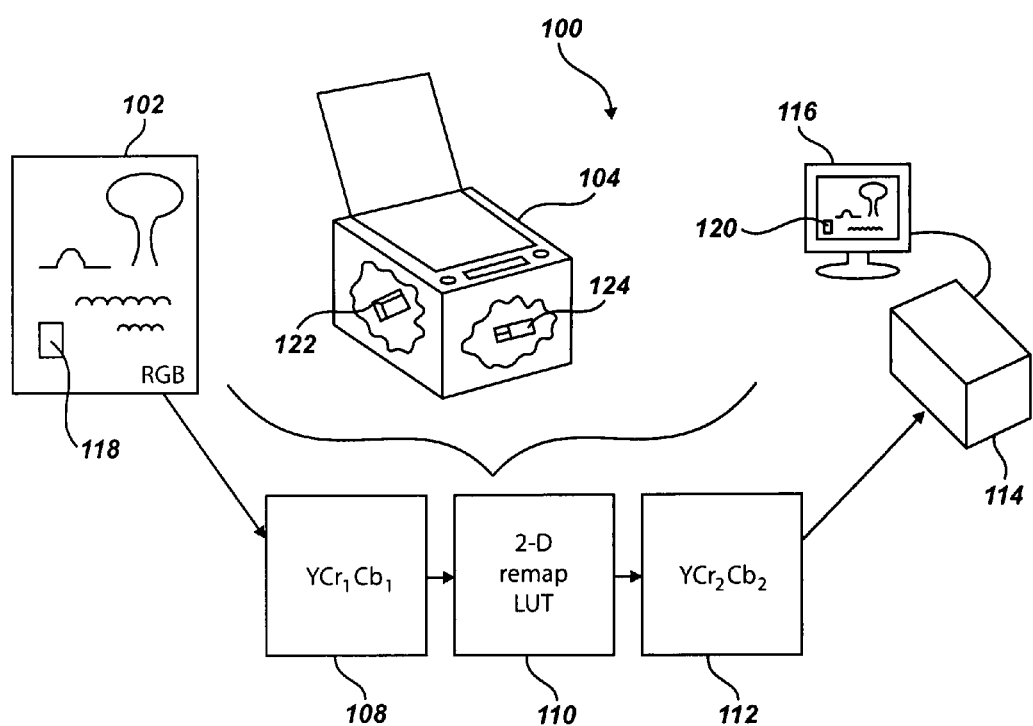
FIG. 1 is an illustration of a preferred process of the present invention for adjusting in a scanner the color of a pixel in a scanned image.

FIG. 1 shows a scanner 104 having a circuit 122 for executing a process 100 for adjusting the color of a pixel 118 in a scanned image 102. It is to be understood that the scanner 104 may be a standalone scanner or part of a multi-function printer (MFP) or other device having a scanner configured to scan an image and output image data for transmission to a host computer 114, monitor 116, or other device for display.

In a preferred version, the circuit 122 adjusts the pixel color and transmits image data from the scanner 104 to a host computer 114 for displaying the pixel 120 on a monitor 116. The circuit 122 may include a processor (not shown) which may be configured to read a memory device (not shown) having processor executable instructions for executing the process 100. The processor may be a software processor, a firmware processor, a hardwire processor, a digital signal processor, a microprocessor, a programmable gate array, a dedicated processor, or other signal processor. The memory device may be RAM, ROM, a flash memory, or other memory device having processor executable instructions for executing the process 100.

In the presently discussed version, the circuit 122 is configured to receive color component values for each pixel based upon data generated by the color image sensor head 124 as the image is scanned. The color component values define levels of pixel attributes, which, depending upon the color space in which the color image sensor head 124 operates, may include color depth, chrominance saturation, luminance, hue, and/or other pixel attributes. For clarity of explanation, aspects of the present invention will be discussed with reference to a color image sensor head 124 operating in the YCrCb color space. It is to be understood that the color image sensor head 124 may operate in other color spaces, including RGB, as discussed below.

The YCrCb color space has a perceptual/non-color component Y to represent luminance, and two color saturation components Cr, for red-minus-luma, and Cb, for blue-minus-luma. It is to be understood that color in the YCrCb color space is dependent upon the saturation levels (e.g., 0 to 255) of the Cr and Cb components. The value of the Y component does not define the color. In this regard, the YCrCb color space is a two-color component color space, in that it does not have a third component also defining color.

In the present version, the circuit 122 is configured to operate in the YCrCb color space. Thus, the circuit 122 receives from the color image sensor head 124 a Y value and $Cr_1$ and $Cb_1$ saturation values 108 for each pixel in the image. To adjust the color of a pixel, the circuit 122 is configured to access remap values to obtain adjusted $Cr_2$ and $Cb_2$ saturation values. In one version, the saturation remap values are obtained from a bidimensional remap look-up table (2-D LUT) 110 in a memory (such as a SRAM or a DRAM) in communication with the circuit 122.

Figure 2:
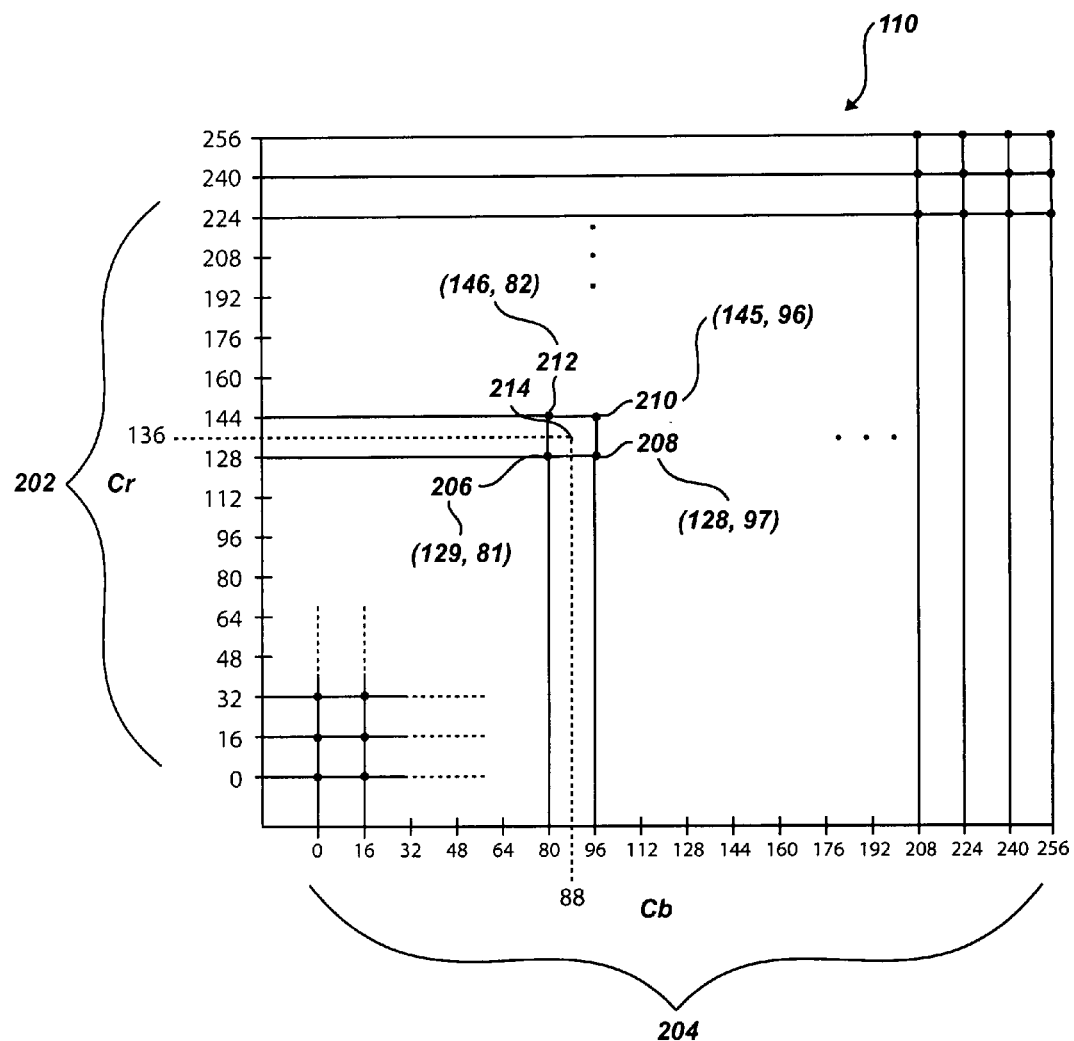
FIG. 2 is bidimensional look-up table populated with color component values for use in adjusting in a scanner the color of a pixel in a scanned image, in accord with a preferred version of the present invention.

One version of a 2-D LUT 110 is shown in FIG. 2. The 2-D LUT 110 is populated with elements (e.g., 206, 208, 210, and 212) having two values. The two values correspond to saturation levels of Cr and Cb color components, respectively. For example, each element may have two 8-bit saturation values, representing the saturation levels of the Cr and Cb color components, respectively. The location of each element in the table is defined by a Cr address value 202 (row) and a Cb address value 204 (column).

The $Cr_1$ and $Cb_1$ saturation values 108 received from the color image sensor head are mapped to element values in the 2-D LUT 110 by Cr and Cb address values. The element values (referred to hereinafter as $Cr_2$ and $Cb_2$) are to replace the $Cr_1$ and $Cb_1$ saturation values for adjusting the color of a pixel. For example, saturation values $Cr_1=128$, $Cb_1=80$ address an element 206 having saturation values $Cr_2=129$ and $Cb_2=81$. Thus, $Cr_1$ and $Cb_1$ saturation values 128 and 80 are replaced with $Cr_2$ and $Cb_2$ saturation values 129 and 81. In operation, the circuit 122 receives saturation values $Cr_1$ and $Cb_1$ corresponding to a first color (from the color image sensor head 124) and outputs saturation values $Cr_2$ and $Cb_2$, corresponding to a second (adjusted) color.

In one version, the 2-D LUT 110 is populated to correct imprecise color representations generated by the color image sensor head 124. The 2-D LUT 110 may be populated to adjust many colors or may be populated to adjust as few as one color. By way of example, if it is known that the color image sensor head 124 provides color component values that correspond to yellow-orange for pure yellow pixels, the element in the 2-D LUT 110 at the yellow-orange address may be populated with color component values that correspond to pure yellow.

A 2-D LUT may be fully or sparsely populated. A fully populated 2-D LUT (not shown) may have an address for every 8-bit color component value, and 16-bit elements (8-bits for each component). A fully populated 2-D LUT may thus comprise 256 rows, 256 columns, 65,536 elements, and require approximately 1M bits of memory.

Referring again to FIG. 2, a sparsely populated 2-D LUT 110 is shown. The 2-D LUT 110 has 8-bit address values, however there are only seventeen 8-bit Cr address values along the row index, and seventeen 8-bit Cb address values along the column index. The table elements provide saturation values for 289 of the possible 65,536 $Cr_1Cb_1$ combinations. This table requires approximately 4.6 k bits of memory and may be readily implemented in most scanner circuits without adding a memory device. In one version, the table is implemented in a memory device, such as an SRAM or DRAM, in an application specific integrated circuit in the scanner of a multi-function printer. The table may be implemented in other types of memory devices as well.

In the sparsely populated version, adjusted saturation values are obtained from the table by interpolation. For example, adjusted saturation values can be obtained from the table for $Cr_1=136$ and $Cb_1=88$ by retrieving the Cr and Cb saturation values in the four closest elements 206, 208, 210, and 212. In the illustrated example, all four elements are equidistant from point 214. According to one method of interpolation, the saturation value of $Cr_2$ is obtained by averaging the Cr saturation values of elements 206, 208, 210, and 212, where Cr=129, 128, 145, and 146, respectively, and therefore $Cr_2=137$. The saturation value of $Cb_2$ is obtained by averaging the Cb saturation values of elements 206, 208, 210, and 212, where Cb=81, 97, 96, and 82, respectively, and therefore $Cb_2=89$. Based on the disclosure and teachings provided herein, other methods of interpolating in M×M×2 tables may be used.

The versions discussed above have been described in connection with adjusting image pixel colors provided by a color image sensor head 124 operating in a two color component (YCbCr) color space. Other versions of the disclosed embodiments may be implemented in scanners having color image sensor heads operating in other color spaces, including those having three or more color components, such as the RGB color space. In such versions, the scanner 104 may be configured to convert a three or more color component color space to a two color component color space (such as YCrCb) before adjusting the color. Techniques for converting image data from three or four color component color spaces to two color component color spaces include transformation and conversion formulas that are well known to those skilled in the art. Such techniques may be implemented by a circuit, such as the scanner circuit 122, in communication with the color image sensor head 124, and may be implemented by software, firmware, or hardware.

The scanner circuit 122, or another circuit, may be configured to convert the adjusted color to another color space. For example, the scanner circuit 122 may be configured to convert an adjusted color from the YCrCb color space to the RGB color space before communicating the adjusted color to another device, such as a host computer.

It is intended that the foregoing detailed description be understood as an illustration of selected forms that the invention can take and not as a definition of the invention. It is only the following claims, including all equivalents, that are intended to define the scope of this invention.

What is claimed is:

1. A method of adjusting a scanned image, comprising:
receiving light from an image that has been scanned at a color image sensor head;
generating, based on the image scanned at the color image sensor head, a first color component sensor value and a second color component sensor value for a pixel of the image, wherein the first and second color component sensor values do not correspond to a luminance value; and interpolating a plurality of neighboring first color component values, from a two-dimensional lookup table ("2-D LUT), that correspond to the first color component sensor value;

replacing the first color component sensor value with a modified first color component sensor value based on the interpolation of the plurality of neighboring first color component values;

interpolating a plurality of neighboring second color component values, from the 2-D LUT, that correspond to the second color component sensor value;

replacing the second color component sensor value with a modified second color component sensor value based on the interpolation of the plurality of neighboring second color component values, and transmitting the modified first color component sensor value and the modified second color component sensor value to be displayed on a display device, wherein the modified first color component sensor value and the modified second color component sensor value are in a two-color component color space, and wherein the 2-D LUT is tailored to correct an imperfection in the color image sensor head by including calibrated color component sensor values to correct for a known imperfection in the color image sensor head, the imperfection being a measure of a difference between colors of the image and colors generated by the color image sensor head.

2. The method of claim 1 further comprising:
receiving from the color image sensor head a set of three color component sensor values in a three-color component color space for defining the image; and
converting the set of three color component sensor values to the first color component sensor value and the second color component sensor value of the two-color component color space.

3. The method of claim 1, wherein the two-color component color space is a YCbCr color space, and the first color component sensor value corresponds to a Cb component and the second color component corresponds to a Cr component.

4. The method of claim 3 wherein the page scanner is part of a multi-function printer, further comprising converting the first color component second value, the second color component second value, and a Y value to three output color component values in a RGB color space and communicating the three output color component values to a host computer.

5. The method of claim 1 further comprising providing an $M^2$ number of possible first color component and second color component combinations, and wherein the 2-D LUT has less than M number of row addresses and less than M number of column addresses.

6. The method of claim 5 wherein the 2-D LUT includes elements having two values to define Cr and Cb saturation levels, respectively, on a scale of zero to two-hundred-fifty-five, and the 2-D LUT has no more than seventeen row addresses and seventeen column addresses.

7. The method of claim 1 further comprising:
storing the 2-D LUT in a memory, wherein interpolating the modified first color component sensor value and the modified second color component sensor value from the 2-D LUT is based on a first color component value nearest to the first color component sensor value and a second color component value nearest to the second color component sensor value in the 2-D LUT.

8. The method of claim 1, wherein the page scanner includes a lid configured to close against a medium comprising the image.

9. The method of claim 1, wherein the 2-D LUT is configured to modify a multi-color pixel generated by the color image sensor head to a pure color pixel.

10. A method of adjusting a scanned image, comprising:
receiving light from an image that has been scanned at a color image sensor head;
generating, based on the image scanned at the color image sensor head, a first color component sensor value and a second color component sensor value for a pixel of the image, wherein the first and second color component sensor values do not correspond to a luminance value;
accessing a modified first color component corresponding to the first color component sensor value and a modified second color component sensor value corresponding to the second color component in a two-dimensional lookup table ("2-D LUT"); and
replacing the first color component sensor value with the modified first color component sensor value;
replacing the second color component sensor value with the modified second color component sensor value; and
transmitting the modified first color component sensor value and the modified second color component sensor value to be displayed on a display device,
wherein the 2-D LUT is tailored to correct an imperfection in the color image sensor head by including calibrated modified color component sensor values to correct for a known imperfection in the color image sensor head, the imperfection being a measure of a difference between colors of the image and colors generated by the color image sensor head.

11. The method of claim 10, wherein the same color space is a YCrCb color space, further comprising:
defining the image in a RGB color space;
converting the image from the RGB color space to the YCrCb color space; and
converting the modified first color component sensor value and the modified second color component sensor value to RGB color space values and communicating the RGB color space values to a host computer for display on the host computer.

12. The method of claim 10 further comprising interpolating the modified first and second color component sensor values from the 2-D LUT.

13. The method of claim 10, wherein the 2-D LUT is configured to modify a multi-color pixel generated by the color image sensor head to a pure color pixel.

14. A non-transitory computer readable storage medium having processor executable instructions to:
receive an image at a color image sensor head;
generate, based on the image received at the color image sensor head, a first color component sensor value and a second color component sensor value for a pixel of the image, wherein the first and second color component sensor values do not correspond to a luminance value, and
interpolate a plurality of neighboring first color component values, from a two-dimensional lookup table ("2-D LUT), that correspond to the first color component sensor value;
replace the first color component sensor value with a modified first color component sensor value based on the interpolation of the plurality of neighboring first color component values;
interpolating a plurality of neighboring second color component values, from the 2-D LUT, that correspond to the second color component sensor value;

replace the second color component sensor value with a modified second color component sensor value based on the interpolation of the plurality of neighboring second color component values;

transmit the modified first color component sensor value and the modified second color component sensor value to be displayed on a display device, wherein the modified first color component sensor value and the modified second color component sensor value are in the two-color component color space, and wherein the 2-D LUT is tailored to correct an imperfection in the color image sensor head by including calibrated modified color component sensor values to correct for a known imperfection in the color image sensor head, the imperfection being a measure of a difference between colors of the image and colors generated by the color image sensor head.

15. The non-transitory computer readable storage medium of claim 14 having processor executable instructions to:

receive from a color image sensor head a set of three color component values in a three-color component color space for defining the image, and convert the set of three color component values to the first color component first value and the second color component first value.

16. The non-transitory computer readable storage medium of claim 14 wherein the two-color component color space is a YCbCr color space, and the first color component corresponds to a Cb component and the second color component corresponds to a Cr component.

17. The non-transitory computer readable storage medium of claim 14 having processor executable instructions to define up to $M^2$ number of colors, wherein the 2-D LUT has less than M number of rows and less than M number of columns.

18. The non-transitory computer readable storage medium of claim 14 having processor executable instructions to access an element in the 2-D LUT having two values to define Cr and Cb saturation levels, respectively, on a scale of zero to two-hundred-fifty-five.

19. The non-transitory computer readable storage medium of claim 14 having processor executable instructions to access the 2-D LUT in an SRAM in an application specific integrated circuit.

20. The non-transitory computer readable storage medium of claim 14 having processor executable instructions to configure the 2-D LUT to modify a multi-color pixel generated by the color image sensor head to a pure color pixel.

21. A non-transitory computer readable storage medium having processor executable instructions to:

receive an image at a color image sensor in a page scanner;

generate, based on the image received at the color image sensor, a first color component sensor value and a second color component sensor value for a pixel of the image, wherein the first and second color component sensor values do not correspond to a luminance value;

access a modified first color component corresponding to the first color component sensor value and a modified second color component sensor value corresponding to the second color component a plurality of elements in a two-dimensional lookup table ("2-D LUT"), and replace the first color component sensor value with the modified first color component sensor value;

replace the second color component sensor value with the modified second color component sensor value;

transmit the modified first color component sensor value and the modified second color component sensor value to be displayed on a display device, wherein the 2-D LUT is tailored to correct an imperfection in the color image sensor by including calibrated modified color component sensor values to correct for a known imperfection in the color image sensor head, the imperfection being a measure of a difference between colors of the image and colors generated by the color image sensor.

22. The non-transitory computer readable storage medium of claim 21 having processor executable instructions to convert the modified first and second color component sensor values from a YCrCb color space to a RGB color space.

23. The non-transitory computer readable storage medium of claim 21 having processor executable instructions to interpolate the modified first and second color component sensor values from the 2-D LUT.

24. The non-transitory computer readable storage medium of claim 21 having processor executable instructions to configure the 2-D LUT to modify a multi-color pixel generated by the color image sensor head to a pure color pixel.

25. An apparatus, comprising:

a color image sensor head configured to read an image that has been illuminated to generate a scanned image;

a memory device configured to store data that includes a two-dimensional lookup table ("2-D LUT") having a plurality of elements, each element comprised of a modified first color component sensor value and a modified second color component sensor value within a two-color component color space; and a circuit configured to:

generate, based on the image scanned at the color image sensor head, a first color component sensor value and a second color component sensor value for a pixel of the image, wherein the first and second color component sensor values do not correspond to a luminance value;

interpolate from the data, a plurality of neighboring first color component values, from the 2-D LUT, that correspond to the first color component sensor value, replace the first color component sensor value with a modified first color component sensor value based on the interpolation of the plurality of neighboring first color component values;

interpolate a plurality of neighboring second color component values, from the 2-D LUT, that correspond to the second color component sensor value;

replace the second color component sensor value with a modified second color component sensor value based on the interpolation of the plurality of neighboring second color component values, and an interface configured to transmit the modified first color component sensor value and the modified second color component sensor value to be displayed on a display device, wherein the modified first color component sensor value and the modified second color component sensor value are in the two-color component color space, and wherein the 2-D LUT is configured to correct an imperfection in the color image sensor head by including calibrated modified color component sensor values to correct for a known imperfection in the color image sensor head, the imperfection being a measure of a difference between colors of the image and colors generated by the color image sensor head.

26. The apparatus of claim 25 wherein the color image sensor head is further configured to scan an image having the pixel color and generate a set of three color component sensor values in a three-color component color space for defining the pixel color, and wherein the circuit is configured to convert the set of three color component sensor values to a modified first color component value and a modified second color component value in the two-color component color space.

27. The apparatus of claim 25 wherein the two-color component color space is a YCbCr color space, and the first color component sensor corresponds to a Cb component and the second color component sensor value corresponds to a Cr compo.

28. The apparatus of claim 25 wherein the circuit is further configured to interpolate up to $M^2$ number of modified color component values, and the 2-D LUT has less than M number of row addresses and less than M number of column addresses.

29. The apparatus of claim 25 wherein the 2-D LUT includes elements having two values to define Cr and Cb saturation levels, respectively, on a scale of zero to two-hundred-fifty-five, and the 2-D LUT has seventeen row address values and seventeen column address values.

30. The apparatus of claim 25, further comprising an application specific integrated circuit comprising an SRAM having the 2-D LUT.

31. The apparatus of claim 25 wherein the apparatus is a multi-function printer comprising a page scanner including the light source and a color image sensor head.

32. The apparatus of claim 25, wherein the 2-D LUT is configured to modify a multi-color pixel generated by the color image sensor head to a pure color pixel.

33. An apparatus, comprising:
a color image sensor head configured to read an image that has been illuminated to generate a scanned image;
a memory having data comprising a two-dimensional lookup table ("2-D LUT"), the 2-D LUT having a plurality of elements, each of the plurality of elements including modified first color component sensor values and a modified second color component sensor values; and
a circuit configured to:
generate, based on the image read at the color image sensor head, a first color component sensor value and a second color component sensor value for a pixel of the image, wherein the first and second color component sensor values do not correspond to a luminance value;
access a modified first color component sensor value corresponding to the first color component sensor value;
access a modified second color component sensor value corresponding to the second color component sensor value;
replace the first color component sensor value with the modified first color component sensor value corresponding; and
replace the second color component sensor value with the modified second color component,
an interface configured to transmit the modified first color component sensor value and the modified second color component sensor value to be displayed on a display device, and
wherein the 2-D LUT is tailored to correct an imperfection in the color image sensor head by including calibrated modified color component sensor values to correct for a known imperfection in the color image sensor head, the imperfection being a measure of a difference between colors of the image and colors generated by the color image sensor head.

34. The apparatus of claim 33 further comprising a color image sensor head for defining a pixel color in an RGB color space and in communication with the circuit.

35. The apparatus of claim 33 wherein the circuit is further configured to interpolate the adjusted first and second values from the 2-D LUT.

36. The apparatus of claim 33, wherein the 2-D LUT is configured to modify a multi-color pixel generated by the color image sensor head to a pure color pixel.

37. An apparatus comprising:
means for generating a scanned image from an image that has been illuminated;
means for generating, based on the image scanned at the color image sensor head, a first color component sensor value and a second color component sensor value for a pixel of the image, wherein the first and second color component sensor values do not correspond to a luminance value; and
a two-dimensional lookup table ("2-D LUT");
means for interpolating a plurality of neighboring first color component values, from a two-dimensional lookup table ("2-D LUT), that correspond to the first color component sensor value;
means for replacing the first color component sensor value with a modified first color component sensor value based on the interpolation of the plurality of neighboring first color component values;
means for interpolating a plurality of neighboring second color component values, from the 2-D LUT, that correspond to the second color component sensor value;
means for replacing the second color component sensor value with a modified second color component sensor value based on the interpolation of the plurality of neighboring second color component values, and
means for transmitting the modified first color component sensor value and the modified second color component sensor value to be displayed on a display device,
wherein the modified first color component sensor value and the modified second color component sensor value are in the two-color component color space, and
wherein the 2-D LUT is tailored to correct an imperfection in the means for generating a scanned image by including calibrated modified color component sensor values to correct for a known imperfection in the color image sensor head, the imperfection being a measure of a difference between colors of the image and colors generated by the means for generating a scanned image.

38. The apparatus of claim 37, wherein the 2-D LUT is configured to modify a multi-color pixel generated by the means for generating a scanned image to a pure color pixel.

* * * * *